(12) United States Patent
Diatzikis et al.

(10) Patent No.: US 7,326,917 B2
(45) Date of Patent: Feb. 5, 2008

(54) WEAR MONITOR FOR TURBO-MACHINE

(75) Inventors: Evangelos V. Diatzikis, Chuluota, FL (US); Michael Twerdochlib, Oviedo, FL (US); Mehrzad Tartibi, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 0 days.

(21) Appl. No.: 11/472,934

(22) Filed: Jun. 22, 2006

(65) Prior Publication Data

US 2007/0295894 A1     Dec. 27, 2007

(51) Int. Cl.
*G02B 6/00* (2006.01)
(52) U.S. Cl. .......................... 250/227.14; 250/227.18; 250/227.23; 418/2; 340/679; 340/683; 60/803; 60/805; 702/34; 702/56; 385/12; 385/13; 73/655
(58) Field of Classification Search ........... 250/227.11, 250/227.14, 227.18, 227.23; 73/9, 660, 655; 418/2; 340/679, 683; 60/803, 805; 702/33, 702/34, 56; 385/12, 13
See application file for complete search history.

(56) References Cited

U.S. PATENT DOCUMENTS

| | | | |
|---|---|---|---|
| 3,835,696 A * | 9/1974 | Amberger et al. ............. 73/649 |
| 4,326,804 A | 4/1982 | Mossey | |
| 4,367,650 A * | 1/1983 | Hilgner et al. ................ 73/649 |
| 4,649,989 A * | 3/1987 | Vermaat et al. ............. 165/11.2 |
| 4,682,894 A | 7/1987 | Schmidt et al. | |
| 4,701,610 A | 10/1987 | Hoogenboom | |
| 4,739,161 A | 4/1988 | Moriyama et al. | |
| 4,899,596 A | 2/1990 | Janik et al. | |
| 4,922,757 A * | 5/1990 | Rozelle et al. ................. 73/660 |
| 5,146,776 A * | 9/1992 | Twerdochlib et al. ........ 73/1.85 |
| 5,201,227 A * | 4/1993 | Iinuma et al. ................ 73/655 |
| 5,473,156 A | 12/1995 | Pinnock et al. | |
| 5,511,426 A * | 4/1996 | Clement et al. .............. 73/655 |
| 5,514,952 A | 5/1996 | Parkinson | |
| 5,557,099 A | 9/1996 | Zielinski et al. | |
| 5,572,039 A | 11/1996 | Sweeney et al. | |
| 5,739,524 A | 4/1998 | Fally | |
| 6,037,581 A | 3/2000 | Zörner | |
| 6,094,989 A * | 8/2000 | Twerdochlib ................. 73/659 |
| 6,426,497 B1 | 7/2002 | Martinez et al. | |
| 6,433,329 B1 | 8/2002 | Butka et al. | |
| 6,856,281 B2 | 2/2005 | Billington et al. | |

FOREIGN PATENT DOCUMENTS

EP        0263016 A1    4/1988

* cited by examiner

*Primary Examiner*—Davienne Monbleau

(57) ABSTRACT

A wear determination device for determining vibration in a turbine engine component to reduce wear in a turbine engine. The wear determination device may be capable of measuring vibrations in a turbine engine component. The vibration measurement may be used to determine vibrations in a turbine engine to identify wear locations and sources of wear. The wear determination device may be configured such that multiple locations in a turbine engine may be monitored on a single turbine engine by moving the wear determination device from location to location.

19 Claims, 1 Drawing Sheet

WEAR MONITOR FOR TURBO-MACHINE

FIELD OF THE INVENTION

This invention is directed generally to wear determination devices, and more particularly to wear determination devices useful for determining wear in turbine engines at operating load.

BACKGROUND

Turbine engines operate under high temperature conditions and create vibrations throughout the engines. The high temperatures and vibrations create a high stress environment under which components of the turbine engines must operate. The vibrations create wear on turbine components and shorten the useful life of many components of a turbine engine. For instance, wear on roots of turbine vanes and turbine blades can cause movement of the components to such an extent that undesired interference with moving parts and damage can occur. Thus, a need exists for a device for identifying a source of vibration in a turbine engine to reduce the destructive impacts of the vibration on turbine engine components.

SUMMARY OF THE INVENTION

This invention is directed to a wear determination device for determining wear in a machine, such as a turbine engine. The wear determination device may be configured to determine vibrations in turbine engine components to identify the cause of component wear. The wear determination device may include an insertion probe configured to position a fiber optic head assembly relative to a surface to be measured. The insertion probe of the wear determination device may be threadably coupled to a machine, such as a vane carrier of turbine engine. In one embodiment, the insertion probe may be coupled to a vane carrier of a turbine engine to provide access for the wear determination device to an airfoil during operation of the turbine engine.

The fiber optic head assembly may include a housing and a fiber optic bundle formed from at least one fiber optic transmission line contained within the housing for transmitting light and at least one fiber optic reception line contained within the housing for receiving light. In at least one embodiment, the fiber optic head assembly may include a plurality of fiber optic transmission and reception lines. The fiber optic head assembly may form a fiber optic probe tip. The fiber optic head assembly may also include a drive device for moving the fiber optic bundle relative to a surface in the machine. The drive device may be coupled to a threaded shaft for moving the fiber optic bundle and may be selected from the group consisting of a stepper motor, a pulsed DC motor with planetary reduction gears, and other appropriate devices. The threaded shaft may communicate with a lead screw positioned in the insertion probe for moving the fiber optic head assembly within the insertion probe. The fiber optic head assembly may be releasably coupled to the insertion probe. The fiber optic head assembly may be configured such that the fiber optic bundle is movable generally parallel to a longitudinal axis of the insertion probe.

The wear determination device may also include a sensor for receiving light transmission through the at least one fiber optic reception line and for displaying a voltage that correlates to vibration that may cause wear of a turbine component. The wear determination device may also include a digital optical resolver coupled to the drive device for controlling movement of the fiber optic head assembly.

The invention also includes a method of determining wear on a component of a machine while the machine is operating. The method includes attaching a vibration measurement device to the machine, wherein the vibration measurement device comprises a fiber optic head assembly comprising a housing, a fiber optic bundle formed from at least one fiber optic transmission line contained within the housing for transmitting light and at least one fiber optic reception line contained within the housing for receiving light, and a drive device for moving the fiber optic bundle relative to a surface in the machine. The wear determination device may also include an insertion probe housing at least a portion of the fiber optic head assembly and adapted to be attached to the machine, wherein the fiber optic head assembly is releasably coupled to the insertion probe, and a sensor for receiving light transmission through the at least one fiber optic reception line. The method also includes emitting light from the at least one fiber optic transmission line to a surface of the machine, receiving light in the at least one fiber optic reception line, and determining vibration of a component of the machine. The method may also calibrating the device by positioning an end of the at least one fiber optic transmission line within about 0.005 inches of a surface, emitting a light through the at least one fiber optic transmission line, receiving the light through the at least one fiber optic receiving line and calibrating the sensor. Also, determining a distance between an end of the at least one fiber optic transmission line and the surface of the machine may include converting the light received through the at least one fiber optic reception line to a voltage.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
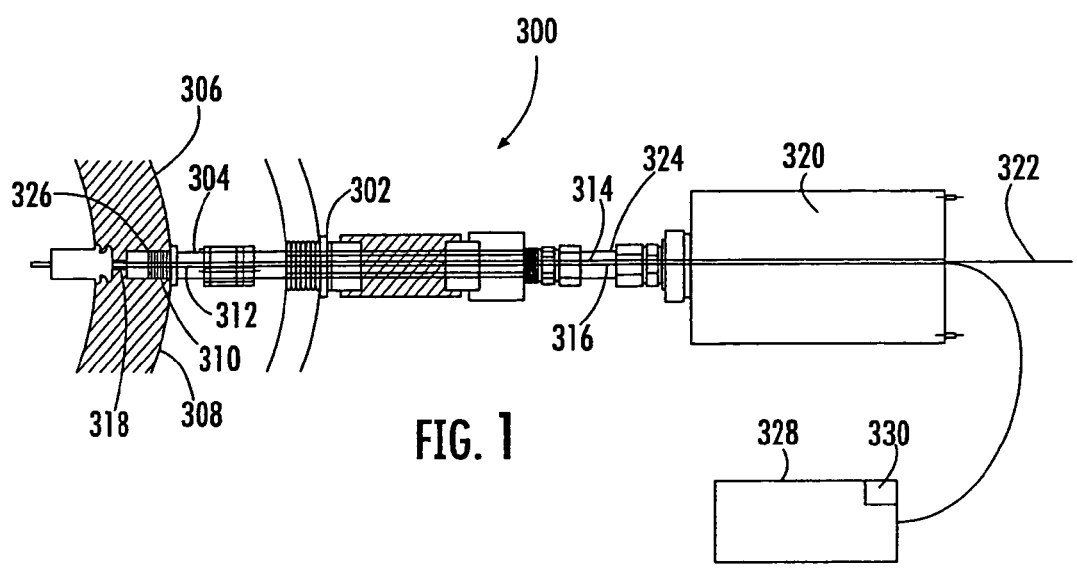
FIG. 1 is a partial cross-sectional view of an alternative embodiment of the wear determination device coupled to a vane carrier.
Figure 2:
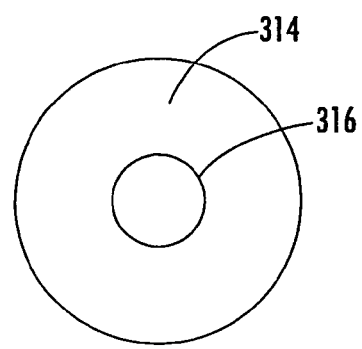
FIG. 2 is an end view of a fiber optic tip of the wear determination device shown in FIG. 1.
Figure 3:
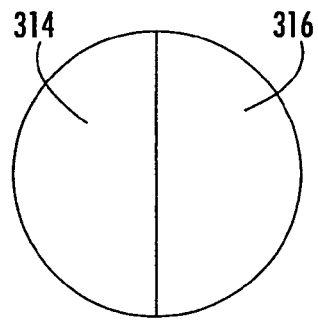
FIG. 3 is an end view of an alternative fiber optic tip of the wear determination device shown in FIG. 1.

This invention is directed to a wear determination device 300 having fiber optic systems usable to determine the amplitude, frequency, and phase of vibrations in turbine engines, as shown in FIGS. 1-3. As shown in FIG. 1, the wear determination device 300 may be formed from an insertion probe 302 configured to house at least a portion of a fiber optic head assembly 304. The insertion probe 302, in at least one embodiment, may be configured to be attached to a machine 306, such as a vane carrier 308 of a turbine engine. The insertion probe 302 may provide access for the wear determination device to an airfoil during operation of the turbine engine. The insertion probe 302 may be positioned proximate to any of the typical thirteen stages in a conventional compressor. The insertion probe 302 may also be positioned proximate to other devices susceptible to wear to identify sources of vibrations causing wear. The insertion probe 302 may be configured to be releasably attached to the machine 302. In at least one embodiment, the insertion probe 302 may be attached to the machine 302 with threads.

The fiber optic head assembly 304 may be formed from a housing 310 and a fiber optic bundle 312 formed one or more fiber optic transmission lines 314 for transmitting light and one or more fiber optic reception lines 316 for receiving light. The fiber optic transmission lines 314 and the fiber optic reception lines 316 may be sealed within the fiber optic head assembly 304. In at least one embodiment, the fiber optic head assembly 304 may be formed from a plurality of fiber optic transmission lines 314 and fiber optic reception lines 316. The fiber optic transmission and reception lines 314, 316 may be formed from any appropriate fiber optic material. The fiber optic head assembly 304 may be releasably connected to the insertion probe 302. A lead screw 326 or other appropriate device may be positioned within the insertion probe 302 for moving the fiber optic head assembly 304 within the insertion probe 302.

The fiber optic head assembly 304 may include a fiber optic probe tip 318 formed from the fiber optic transmission and reception lines 314, 316. The fiber optic probe tip 318 may be formed from various configurations, as show in FIGS. 2-3. For instance, as shown in FIG. 2, the fiber optic probe tip 318 may be formed by a plurality of fiber optic transmission lines 314 surrounding a plurality of fiber optic reception lines 316. In another embodiment, as shown in FIG. 3, the fiber optic probe tip 318 may be formed from a plurality of fiber optic transmission lines 314 on a first side of the fiber optic probe tip 318 and a plurality of fiber optic reception lines 316 on a side opposite to the fiber optic probe tip 318.

A drive device 320 may be included for moving the fiber optic head assembly 304 relative to the insertion probe 302. In at least one embodiment, the drive device 320 may be configured to move the fiber optic head assembly 304 generally parallel to a longitudinal axis 322 of the insertion probe 302. The drive device 320 may be, but is not limited to being, a stepper motor, a pulsed DC motor with planetary reduction gears, or other appropriate drive mechanism. In at least one embodiment, the drive device 320 may be capable of moving the fiber optic head assembly 304 in small increments such as increments of 1/3,000 inch. The drive device 320 may also be coupled to a threaded shaft 324 for moving the fiber optic head assembly 304 relative to the insertion probe 302. Movement of the drive device 320 may be controlled with a digital optical resolver 330 that may be capable of controlling rotational movement of the shaft 324 relative to a mating threaded translation assembly within the fiber optic head assembly 304 by measuring very small rotational movement of the shaft 324, which correlates to translation steps of about 1/3,000 of an inch. The drive device may operate in environments up to about 1,000 Fahrenheit and about 300 pounds per square inch (psi). Bellows (not shown) may seal to permit translation of the translation assembly and pressure boundary.

The wear determination device 300 may also include a sensor 328 for receiving light transmission through the at least one fiber optic reception line 316 and for providing very stable light for the at least one fiber optic transmission line 314. The sensor 328 may be in communication with the at least one fiber optic transmission line 314 to control emission of light. The sensor 328 may include a light source. Alternatively, the wear determination device 300 may include a light source that is separate from the sensor 328. The light source may be, but is not limited to, white light, a LED coherent light source, a white LED, a laser, a tungsten filament, or other appropriate device. The light source is preferably very stable, such as filament white light. The sensor 328 may be configured to receive light through the fiber optic reception line 316 and to determine an amplitude, frequency, and phase of vibration of the turbine component. The sensor 328 may be capable of measuring up to 130,000 Hz and amplitudes of up to about 0.002 of an inch. In one embodiment, the sensor 328 may be, but is not limited to, a MTI 2062R Probe Module manufactured by MTI Instruments INC., of Albany, N.Y.

During use, the wear determination device 300 may be used to measure an amplitude of vibration of the turbine component. The wear determination device 300 may be capable of determining micro-inch displacements in both static and vibratory motion. In particular, the wear determination device 300 may be positioned in place by threadably attaching the insertion probe 302 to a vane carrier 308. The fiber optic probe tip 318 may be calibrated by performing two measurements. The first calibration measurement may be taken when the fiber optic probe tip 318 is positioned about 0.005 inch from a surface to be measured. This distance may be determined by first finding the knee, which is the distance that the fiber optic probe tip 318 is positioned above the measurement surface where the maximum return light voltage output is attained. Once the knee is located, the instrument may be directed to automatically set the intensity of the incandescent light source to compensate for light losses related to the optical fiber and the surface being measurement. The fiber optic probe tip 318 may then be moved toward the measurement surface to a distance that is about half of the distance between the fiber optic probe tip 318 and the measurement surface at the maximum return light voltage. In some embodiments, the half distance may be about 0.0025 inch above the measurement surface. Positioning the fiber optic probe tip 318 in this location positions the fiber optic probe tip 318 generally in the middle of the most sensitive measurement range. The calibration procedure must be repeated often, such as after each measurement, because the factors that influence the measurement can change with time. There also exists a wider, second, less sensitive measurement region on the far side of the knee. This second, less sensitive region extends to approximately 0.060 inch above a surface to be measured. Light may be emitted from the fiber optic transmission line 314, reflected from the surface to be measured, and received into the fiber optic reception line 316.

The second calibration measurement includes moving the fiber optic probe tip 318 to the center of the dynamic measurement range of the fiber optic probe tip 318 before static displacement or vibration is measured. This distance is typically about 0.002 inch in front of the surface to be measured and is typically located by extending the probe tip 318 toward the surface to be measured while the sensor 328 is an a small increment measurement mode. The center of the dynamic measurement range may be located by moving the fiber optic probe tip 318 until the sensor 328 indicates a voltage indicating 2.5 mils, or by moving the fiber optic probe tip 318 2.5 mils toward the surface to be measured. The first and second calibration measurements should be performed before each measurement due to changes in the reflective properties on the surface and fiber optic probe tip 318 with time, temperature, mechanical stress, et cetera.

The fiber optic head assembly 304 may be secured to the insertion probe 302 such that the drive device 320 together with the digital resolver 330 may control translation movement of the fiber optic head assembly 304 along the longitudinal axis 322 so as to locate the fiber optic probe tip 318 at the desired location. The fiber optic head assembly 304 may be coupled to the insertion probe 302 such that as the fiber optic head assembly 304 is moved relative to a surface to be measured, the fiber optic head assembly 304 does not rotate. Measurements of vibrations may be taken in the same manner as the calibration measurements. For instance, measurements may be taken by emitting a light from the fiber optic transmission line 314, reflecting light from the surface to be measured, and receiving light into the fiber optic reception line 316. The light received by the sensor 328 may measure vibrations with a sensitivity of up to a millionth of an inch. The light may be converted to a voltage. The vibration measurement (AC voltage) is far more accurate than the absolute position of the tip as measured by the returned light and corresponding DC voltage.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

We claim:

1. A wear determination device for determining wear mechanisms in a machine, comprising:
    a fiber optic head assembly comprising:
        a housing;
        a fiber optic bundle formed from at least one fiber optic transmission line contained within the housing for transmitting light and at least one fiber optic reception line contained within the housing for receiving light, and
        a drive device for moving the fiber optic bundle relative to a surface in the machine;
    an insertion probe housing at least a portion of the fiber optic head assembly and adapted to be attached to the machine.

2. The wear determination device of claim 1, further comprising a sensor for receiving light transmission through the at least one fiber optic reception line.

3. The wear determination device of claim 1, wherein the insertion probe is threadably coupled to the machine.

4. The wear determination device of claim 1, wherein the insertion probe is coupled to a vane carrier of a turbine engine to provide access for the wear determination device to an airfoil during operation of the turbine engine.

5. The wear determination device of claim 1, wherein the fiber optic bundle is movable generally parallel to a longitudinal axis of the insertion probe.

6. The wear determination device of claim 1, wherein the drive device is coupled to a threaded shaft for moving the fiber optic bundle and is selected from the group consisting of a stepper motor and a pulsed DC motor with planetary reduction gears.

7. The wear determination device of claim 1, wherein the at least one fiber optic transmission line and the at least one fiber optic reception line form a fiber optic probe tip.

8. The wear determination device of claim 1, further comprising a lead screw positioned in the insertion probe for moving the fiber optic head assembly within the insertion probe.

9. The wear determination device of claim 1, further comprising a digital optical resolver coupled to the drive device.

10. A wear determination device for determining wear mechanisms in a machine, comprising:
    a fiber optic head assembly comprising:
        a housing;
        a fiber optic bundle formed from at least one fiber optic transmission line contained within the housing for transmitting light and at least one fiber optic reception line contained within the housing for receiving light, and
        a drive device for moving the fiber optic bundle relative to a surface in the machine;
    an insertion probe threadably coupled to the machine and housing at least a portion of the fiber optic head assembly;
    wherein the fiber optic head assembly is coupled to the insertion probe; and
    a sensor for receiving light transmission through the at least one fiber optic reception line.

11. The wear determination device of claim 10, wherein the insertion probe is coupled to a vane carrier of a turbine engine to provide access for the wear determination device to an airfoil during operation of the turbine engine.

12. The wear determination device of claim 10, wherein the fiber optic bundle is movable generally parallel to a longitudinal axis of the insertion probe.

13. The wear determination device of claim 10, wherein the drive device is coupled to a threaded shaft for moving the fiber optic bundle and is selected from the group consisting of a stepper motor and a pulsed DC motor with planetary reduction gears.

14. The wear determination device of claim 10, wherein the at least one fiber optic transmission line and the at least one fiber optic reception line form a fiber optic probe tip.

15. The wear determination device of claim 10, further comprising a lead screw positioned in the insertion probe for moving the fiber optic head assembly within the insertion probe.

16. The wear determination device of claim 10, further comprising a digital optical resolver coupled to the drive device.

17. A method of determining wear mechanisms on a component of a machine while the machine is operating, comprising:
    attaching a vibration measurement device to the machine, wherein the vibration measurement device comprises a fiber optic head assembly comprising a housing, a fiber optic bundle formed from at least one fiber optic transmission line contained within the housing for transmitting light and at least one fiber optic reception line contained within the housing for receiving light, and a drive device for moving the fiber optic bundle relative to a surface in the machine;
    an insertion probe housing at least a portion of the fiber optic head assembly and adapted to be attached to the machine;
    wherein the fiber optic head assembly is releasably coupled to the insertion probe; and
    a sensor for receiving light transmission through the at least one fiber optic reception line;
    emitting light from the at least one fiber optic transmission line to a surface of the machine;
    receiving light in the at least one fiber optic reception line; and
    determining vibration of a component of the machine.

18. The method of determining wear in claim 17, further comprising positioning an end of the at least one fiber optic transmission line within about 0.0025 inches of a surface, emitting a light through the at least one fiber optic transmission line, receiving the light through the at least one fiber optic receiving line and calibrating the sensor.

19. The method of determining wear of claim 17, wherein determining vibration of a component of the machine comprises converting the light received through the at least one fiber optic reception line to a voltage.

* * * * *